Figure 1:
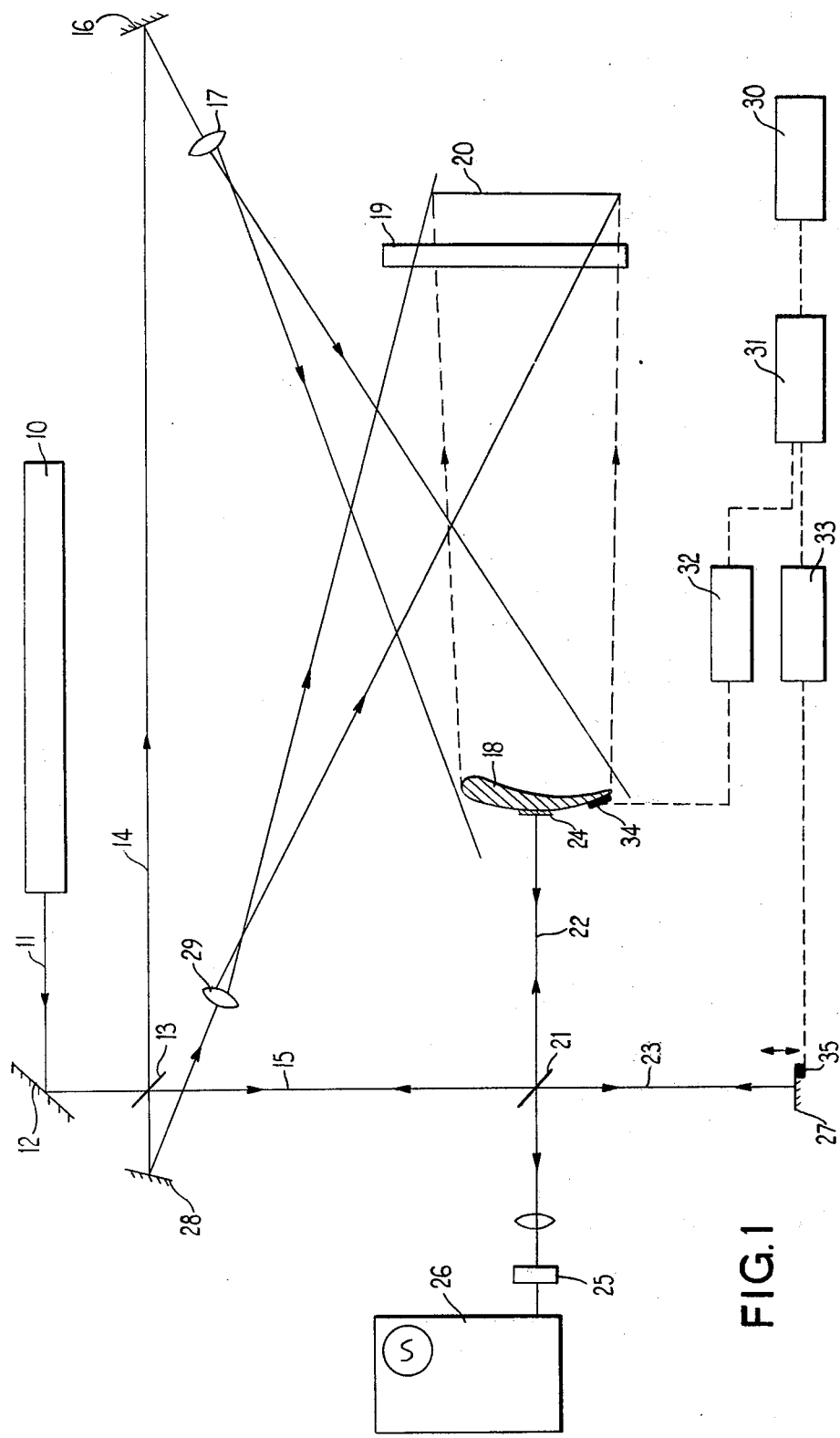

United States Patent [19]
Hockley

[11] 3,899,921
[45] Aug. 19, 1975

[54] METHOD AND APPARATUS FOR TESTING AN OBJECT

[75] Inventor: Bernard Spencer Hockley, Ambergate, England

[73] Assignee: Rolls-Royce (1971) Limited, London, England

[22] Filed: Oct. 30, 1973

[21] Appl. No.: 411,093

[30] Foreign Application Priority Data
Nov. 2, 1972 United Kingdom............... 50634/72

[52] U.S. Cl. .................... 73/67.2; 73/67.7; 73/71.3
[51] Int. Cl. ............................................ G01n 21/00
[58] Field of Search............... 73/67.5 H, 71.3, 67.7, 73/67.5 R, 67.2; 350/3.5

[56] References Cited
UNITED STATES PATENTS
| | | | |
|---|---|---|---|
| 3,545,259 | 12/1970 | Grant.............................. | 350/3.5 X |
| 3,572,936 | 3/1971 | Johnson et al................ | 350/3.5 UX |
| 3,659,947 | 5/1972 | Neumann........................... | 350/3.5 |
| 3,666,344 | 5/1972 | Mottier........................ | 73/67.5 H X |

OTHER PUBLICATIONS
Brandt, G. B., Holography at the Crossroads, October 1970, from Optical Spectra, Vol. 4, No. 9, pp. 26–31.

*Primary Examiner*—Jerry W. Myracle
*Attorney, Agent, or Firm*—Cushman, Darby & Cushman

[57] ABSTRACT

A method of testing an object in which a beam of laser radiation is split into two portions, the object is illuminated with a first beam portion and is caused to vibrate, one of said beam portions is phase modulated in predetermined phase relationship with the object vibration and the radiation scattered from the blade is caused to fall upon a photographic emulsion together with the second reference beam portion to form a hologram. The invention also comprises apparatus for carrying out this method.

16 Claims, 2 Drawing Figures

METHOD AND APPARATUS FOR TESTING AN OBJECT

This invention relates to a method and apparatus for testing an object.

It has previously been proposed to use the technique of time-averaged holography to visualise the vibration pattern of a vibrating object. This technique involves the reconstruction of a holographically stored image. The hologram is formed by two split portions of a laser beam, one of which illuminates the vibrating object. Part of this light is then scattered onto the hologram. The second portion of the light is projected directly onto the hologram to form the reference. Interference between the two beams enables a hologram to be formed where the beams join, the hologram having information which provides a representation of the blade with a pattern of fringes thereon and indicating a degree of vibration of the blade surface. This technique is described in British Pat. No. 1,218,865.

One difficulty arising with this technique is that only a relatively small amplitude of vibration may be visualised. Thus since each fringe represents half a wavelength difference in total movement compared with the next adjacent fringe, and only a relatively small number of fringes can be resolved (about 20) the practical limit of this technique is about 50 microns. This is clearly not always satisfactory when it is frequently necessary to consider movements of 0.2 mm and above for realistic conditions.

The present invention provides a technique which enables the visualisation of vibrations of greater amplitude.

According to the present invention a method of testing an object comprises splitting a beam of laser radiation into two portions, illuminating the object with a first beam portion, causing the object to vibrate, modulating the phase of one beam portion in predetermined phase relationship with the vibration of the object, and causing the radiation scattered from the blade together with the second reference beam portion to fall upon a photographic emulsion or other suitable means to form a hologram.

Preferably the reference beam is modulated in phase or in antiphase with the vibration of the object, when the reference beam is modulated, the in phase modulation being used to visualise large vibrations and the out of phase being used for small vibrations. It is easier in practice to modulate the reference beam rather than the illuminating beam.

The amplitude of the modulation of the phase modulated beam portion may be predetermined to match the amplitude of vibration of a particular point of interest on the object. Thus it is useful to choose various values of the amplitude of modulation and to expose the emulsion at each of these values, giving a composite hologram.

Preferably a number of values of amplitude are chosen such as to enhance fringes spaced apart by a set number of fringes so that the hologram, when reconstructed, shows a plurality of enhanced fringes which indicate equispaced degrees of vibration.

Reconstruction of the hologram is preferably effected by viewing the developed photographic emulsion by laser radiation similar to that used to form it; a photograph may be taken of the reconstruction to provide a comprehensible record of the vibration of the object.

It may be necessary to use a separate device to determine the amplitude of the phase modulation necessary to enhance a particular fringe of the fringe system by which the vibration of the object is visualised. Thus a Michelson interferometer may be used to compare a part of the laser beam reflected from a mirror attached to the vibrating object, with the phase modulated portion.

Alternatively a strain gauge or accelerometer may be used to measure the relative phase of the objects vibration.

Phase modulation may be applied to the chosen beam by reflecting it from a mirror vibrating at the same frequency as the vibrating object, or alternatively an electro-optical device such as a pockel cell may be used.

The invention also includes apparatus for carrying out this method comprising a source of laser radiation a beamsplitter adapted to divide the beam of laser radiation into two portions, one of which is directed at the object, a vibrator adapted to vibrate the object, a phase modulator adapted to modulate the phase of one of said beam portions in predetermined phase relationship with the vibration of the object, and support means adapted to hold a photographic emulsion at a position where the beam portion scattered from the object and the other portion combine.

The phase modulator may comprise a mirror vibrated in phase with the object vibrations and from which the laser beam portion is reflected. Preferably the same power supply is used for both vibrators.

There may be means by which the relative phase of the two beam portions may be compared; thus a Michelson interferometer could be used for this purpose.

The invention is particularly but not exclusively of use in the testing of blades of gas turbine engines.

Figure 2:

The invention will now be particularly described with reference to the accompanying drawings in which:

FIG. 1 is a diagrammatic view of apparatus in accordance with the invention, and FIG. 2 is a view of an object showing vibration patterns visualised by the use of the present invention.

Referring first to FIG. 1 a collimated laser source 10 provides a beam of laser radiation shown at 11. In this case the laser was an Argon ion laser which produced visible radiation of 0.5145 microns wavelength. The laser beam reflects from a mirror 12 onto a beamsplitter 13. The beam is there divided into two portions, a reflected portion 14 and a transmitted portion 15.

The reflected portion 14 is again reflected by a mirror 16 and passes through a spatial filter and lens arrangement indicated at 17 where the shape of the beam is modified to provide the necessary coverage of the object 18. From the object 18 the scattered beam passes through a shutter 19, when this is open, onto a photographic plate 20.

The transmitted beam 15 is directed on to a second beamsplitter 21 and again is split into a reflected portion 22 and a transmitted portion 23. The reflected portion 22 falls on a mirror 24 attached to the back of the object 18 and reflects directly back through the beamsplitter 21 onto a photodetector 25 whose output is displayed on an oscilloscope 26.

The transmitted portion 23 falls on a reference mirror 27 which is vibrated in phase with the vibrations of the object 18 by a control system described below. The radiation reflected from the mirror is thus phase modulated in phase with the vibration of the object 18.

This phase modulated beam passes in reverse through the beamsplitter 21 and is again divided into two portions. The reflected portion is not denoted by a reference number to avoid confusion, but it falls on the same photodetector 25 as the reflected beam 22, and the oscilloscope 26 thus displays the combined resultant of these beams, the splitter 21, mirrors 24 and 27 and detector 25 thus forming a Michelson interferometer.

The transmitted portion of the phase modulated beam returns along the path of the beam 15 to the splitter 13 and is there reflected on to a mirror 28, through a spatial filter and lens system 29 which suitably shapes the beam, and through the shutter 19, when open, on to the plate 20.

The vibration of the object 18 and the reference mirror 27 is actuated and controlled by a variable frequency oscillator 30 whose output is divided into two portions whose relative phase may be adjusted by a phase adjustment 31. The phase adjuster is used to compensate for the inherent phase delay in the mechanical response of the object 18 and its vibrator 34 with respect to the applied electrical signal from the oscillator 30. The outputs from the phase adjustment 31 pass through amplifiers 32 and 33 to drive vibrators 34 and 35 which vibrate the object 18 and reference mirror 27 respectively, the amplifier 33 being of variable gain to enable the amplitude of vibration of the mirror 27 to be varied.

Operation of the apparatus is as follows. The laser 10 is caused to operate, and the oscillator 30 is set to operate at the desired frequency. The amplitude of the vibration of the mirror 27 is chosen to match a desired degree of motion of the blade, and the vibrational phase of the mirror 27 and the object 18 are locked together by the phase adjuster 31 to be either in phase or 180° out of phase.

As an instance of this procedure, the blade shown in FIG. 2 was first set up with the reference mirror amplitude equal to that of the blade at 8 fringes away from the mode; this was carried out by increasing the amplitude of the reference mirror vibrations from zero while watching the oscilloscope 26 and counting the number of fringes passing until eight have passed. When the system is stable in this condition, the beamsplitter 21 is removed to isolate the Michelson interferometer from the holographic system and then the shutter 19 is opened for an experimentally determined exposure.

The phase of the reference mirror 27 is then advanced or retarded by an additional 180° to accommodate regions of the object which are vibrating 180° out of phase with respect to those parts that were in phase for the previous exposure and the hologram again exposed by opening shutter 19.

After the shutter 19 has closed again, the amplitude of the reference mirror oscillation is again increased, in this case to match the vibration of the 18th fringe, using the oscilloscope as before. Again the shutter 19 is opened twice when the system is stable, to superimpose the holographic pattern with the 18th fringe enhanced over that with the 8th enhanced.

This process may be repeated until the limit of mirror vibration is reached. In the embodiment described the limit was set by the inertia and consequent vibrational instability of the mirror which distorted results above about 1,000 fringes. In the case of the blade illustrated in FIG. 2 it was only necessary to go up to the 25th fringe, which was carried out immediately after the 18th mentioned above.

The photographic plate 20 was then developed, and the resulting hologram could be viewed by eye when it was placed in the laser beam, or it could be placed in the beam and the resulting reconstruction photographed in the normal way to provide a comprehensible depiction of the vibration contours on the blade. FIG. 2 is drawn from such a photograph and shows how the nodes and the 8th, 18th and 25th fringes (corresponding to vibrational amplitudes of 0, 2.05, 4.6 and 6.4 microns respectively) are enhanced.

It will be appreciated that subject to practical difficulties such as the avoidance of deformation of the mirror, this technique can be used to enhance fringes up to those representing relatively large vibrational amplitudes; we expect that using present technology a vibrational amplitude of 0.5 mm can be visualised.

The Michelson interferometer may be omitted from the system and the relative vibrational phase of the object 18 and modulating mirror 27 may be monitored by a strain gauge (not shown). Again, the amplitude of the vibrating mirror 35 may be adjusted through a number of predetermined amplitudes; by using these techniques it is possible that a relatively simply operated, possibly partly automatic system may be produced.

When such large amplitudes of vibration are to be visualised, it may be desirable to take exposures at steps of large numbers (say 50) of fringes; in this case the enhanced fringes would be bright in the reconstruction but the intervening fringes would be blurred together, and this would probably ease analysis of the vibration.

There are various ways in which the apparatus and method could be modified. Thus the phase modulation of the reference beam could be carried out using an electro-optical device such as a pockel cell, and it will be understood that it would be possible instead of modulating the reference beam 15 to modulate the illuminating beam 14 in reverse fashion to achieve the same result.

Where the object is subject to vibrations which are undesirable and not those induced by the vibrator, it is possible to further modulate the reference or illuminating beam to cancel these vibrations; thus by reflecting one of the beams from a mirror attached to the object it is possible to produce phase modulation to cancel out the effect of these vibrations.

It should also be noted that this technique can be used to indicate the phase of the vibration of areas of an object; thus enhanced fringes will only be formed on parts of the object that are in phase with the reference mirror, hence the necessity to take two exposures with 180° phase change when a normal complete representation is required.

Again, although in its most useful form the invention contemplates the multiplexing of a number of images on one hologram, it is possible to simply expose one image on each hologram so that the fringes of a particular amplitude are enhanced for study.

A further technique which could be used is to visualise very small vibrations of less than 0.1 of a fringe (say 0.02 microns). In this case the modulation of the reference beam would be in antiphase to that of the object, and the path length changes caused by the vibration would be increased.

It will be understood that although described above the invention was used with a blade as object, there are many other items which could be used, and that it is not necessary to use visible laser radiation.

I claim:

1. A method of testing an object comprising the steps of:
   splitting a beam of laser radiation into a first and second portion,
   illuminating the object with the first beam portion,
   vibrating the object,
   modulating the phase of one beam portion in a first predetermined phase relationship with the vibration of the object,
   combining the radiation scattered from the object with the second beam portion to form a hologram,
   altering the modulation of the phase of the modulated beam portion to a second predetermined phase relationship, and
   combining the radiation scattered from the object with the second beam portion to modify said hologram to contain information from said conditions of phase modulation.

2. A method as claimed in claim 1 in which said phase modulated beam is modulated in phase or an antiphase with the vibration of the object.

3. A method as claimed in claim 1 in which the reference beam is modulated.

4. A method as claimed in claim 1 in which the amplitude of the phase modulation of the beam is predetermined to match the amplitude of vibration of a particular part of the object.

5. A method as claimed in claim 1 in which said different values of the amplitude are chosen to enhance interference fringes on the object spaced apart by a predetermined number of fringes to indicate equispaced amplitudes of vibration.

6. A method as claimed in claim 1 in which the hologram is reconstructed by developing an emulsion and viewing the hologram when illuminated by laser radiation similar to that used for form it.

7. A method as claimed in claim 6 and in which the reconstructed hologram is photographed to provide a lasting record of the vibration of the object.

8. An apparatus for testing an object comprising in combination:
   a source of laser radiation,
   a beam splitter adapted to divide the beam of laser radiation from said source into two portions, one of which is directed at the object,
   a vibrator means for vibrating the object,
   a phase modulator for modulating the phase of one of said beam portions in predetermined phase relationship with the vibration of the object,
   means for producing a hologram,
   supporting means for holding said means for producing a hologram at a position where the beam portion scattered from the object and the other beam portion combines, and
   means for adjusting the phase of said modulated beam portion so that the radiation scattered from the object combines with the other beam portion to modify said hologram so that it contains information from both conditions of phase modulation.

9. Apparatus as claimed in claim 8 in which said phase modulator comprises a pockel cell.

10. Apparatus as claimed in claim 8 in which said phase modulator comprises a mirror vibrated in phase with the vibration of part of the object and from which one said beam portion is reflected.

11. Apparatus as claimed in claim 10 in which said mirror is affixed to said object.

12. Apparatus as claimed in claim 10 in which said mirror is vibrated by a vibrator driven from the same power source as is said object vibrator.

13. Apparatus as claimed in claim 10 further comprising a Michelson interferometer for comparing the phase of the modulated beam portion and a further portion of the beam reflected from a mirror on the object to thereby modulate the beam in accordance with the vibration of part of the object.

14. Apparatus as claimed in claim 10 further comprising strain gauge means mounted to measure the vibration of the object and mirror to thereby enable the relative phases of these to be monitored.

15. Apparatus as claimed in claim 8 further comprising a mirror mounted on the object adapted to further modulate the beam portion whose phase is modulated by said phase modulator whereby the effect of ambient vibrations on the object is reduced.

16. Apparatus as claimed in claim 8 further comprising a shutter device by which a predetermined amount of said laser radiation may be permitted to fall on said emulsion at predetermined times.

* * * * *